United States Patent [19]

Norlie et al.

[11] Patent Number: 4,485,857

[45] Date of Patent: Dec. 4, 1984

[54] DOOR PROCESSING MACHINE

[75] Inventors: Bruce D. Norlie, Durham; Charles A. Knighten, Chico, both of Calif.

[73] Assignee: Norfield Manufacturing Co., Chico, Calif.

[21] Appl. No.: 455,436

[22] Filed: Jan. 3, 1983

[51] Int. Cl.³ .............................. B27C 9/04; B27C 3/02
[52] U.S. Cl. ............................................. 144/3 R; 144/27;
144/365; 144/371; 408/12; 408/26
[58] Field of Search ................ 144/27, 3 R, 1 R, 353, 144/371, 365, 356; 408/49, 26, 12

[56] References Cited

U.S. PATENT DOCUMENTS

| 2,945,520 | 7/1960 | Grubb | 144/27 |
| 3,263,723 | 8/1966 | Sheffield et al. | 144/353 |
| 3,280,863 | 10/1966 | Sturgis | 144/27 |
| 3,313,327 | 4/1967 | Goldstein | 144/27 |
| 3,319,672 | 5/1967 | Phelps | 144/27 |
| 3,331,410 | 7/1967 | Mayo | 144/27 |
| 3,339,601 | 9/1967 | Christman et al. | 144/27 |
| 3,344,825 | 10/1967 | Kualheim et al. | 144/27 |

Primary Examiner—W. D. Bray
Attorney, Agent, or Firm—Townsend and Townsend

[57] ABSTRACT

A door machine for preparing a door for hanging by automatically sizing, drilling the lock and latch holes, and forming the face plate mortise in an edge of the door. The apparatus includes a support frame to which are mounted motor-driven elements, controlled to operate in a predetermined sequence, that size (i.e., cut to a specific transverse dimension) the door and form the lock bore, latch hole, and the face plate mortise in or proximate a free edge of the door. A power-feed mechanism is included for transporting the door from an input station to a drill station. Hydraulic power is used to drive certain elements of the apparatus, including the drills used to form the lock bore and the latch hole.

20 Claims, 12 Drawing Figures

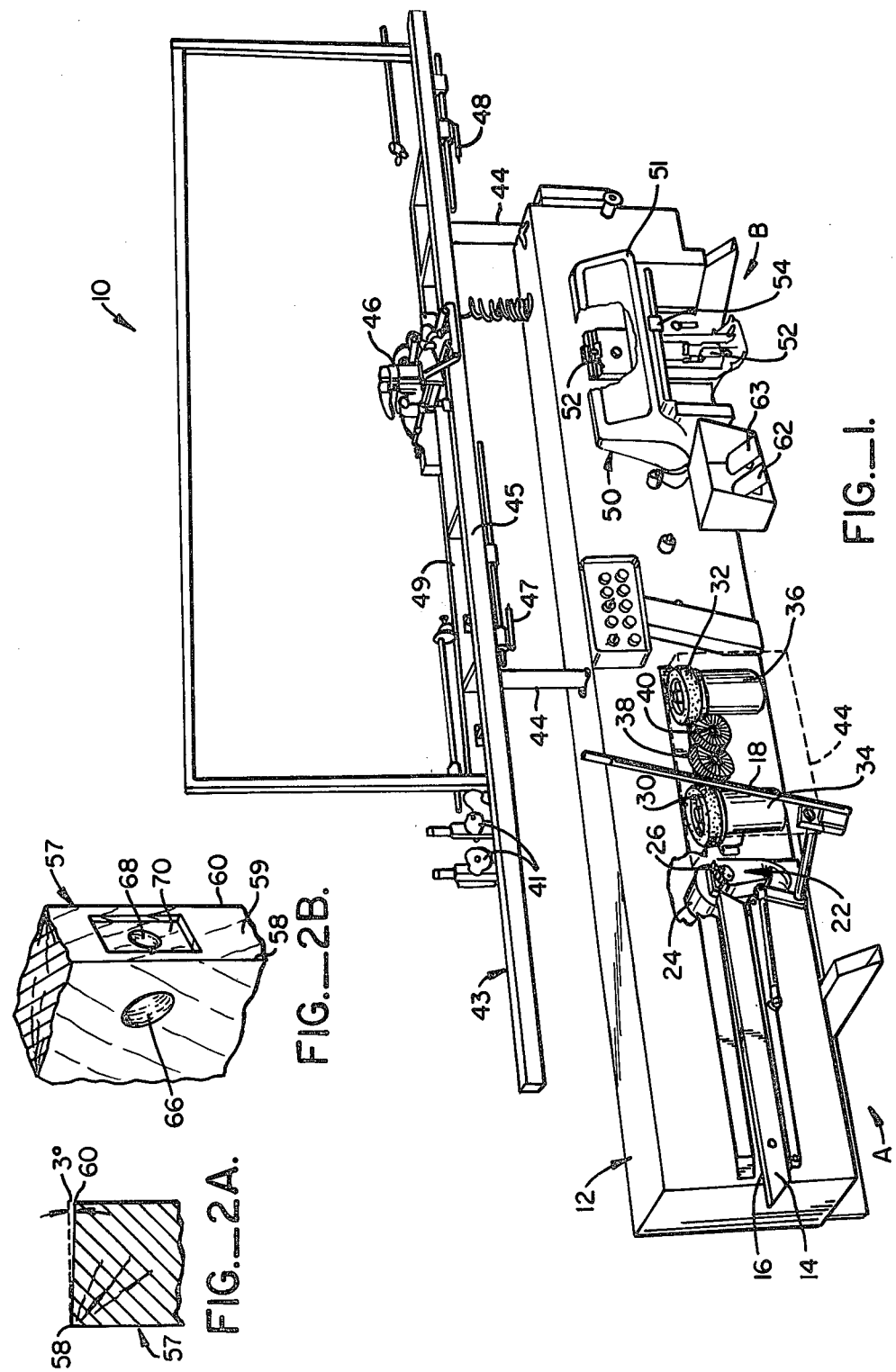

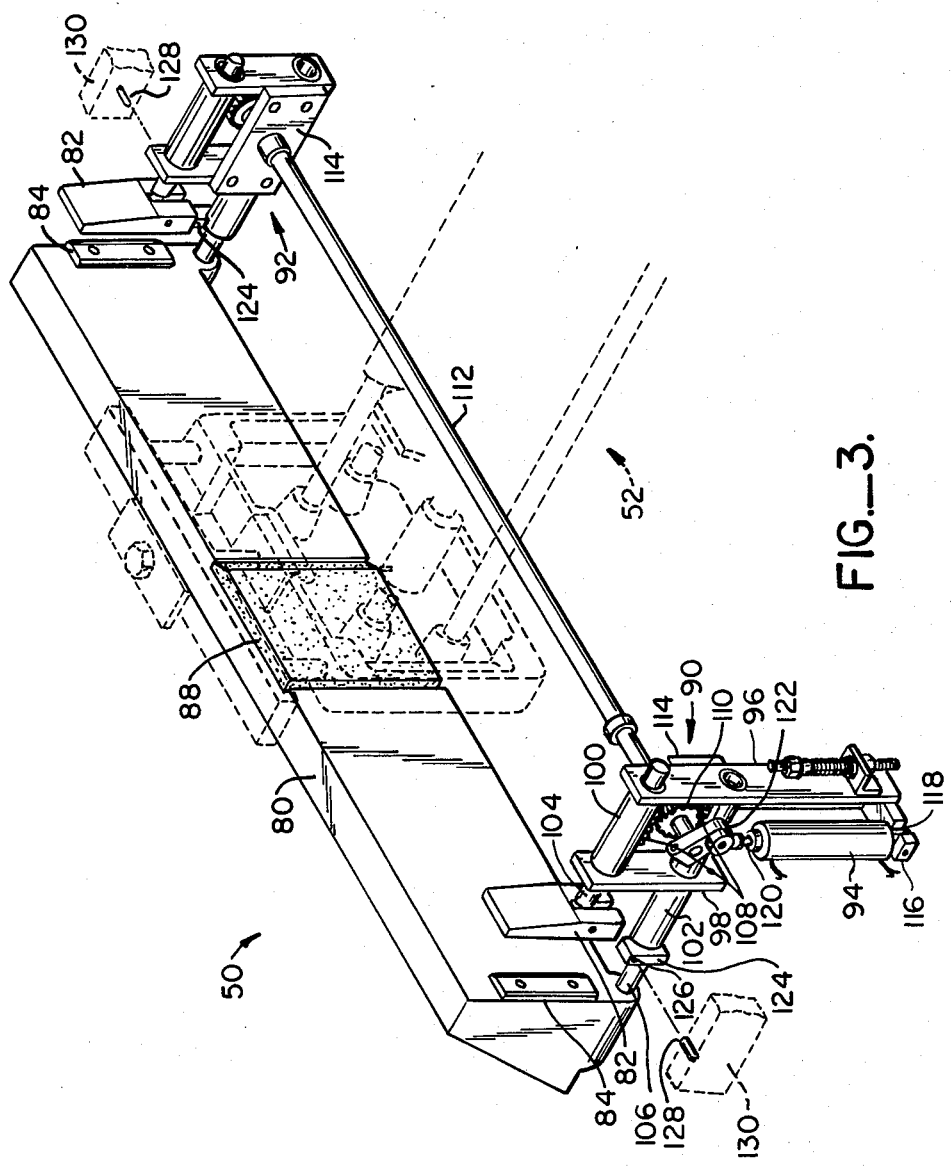

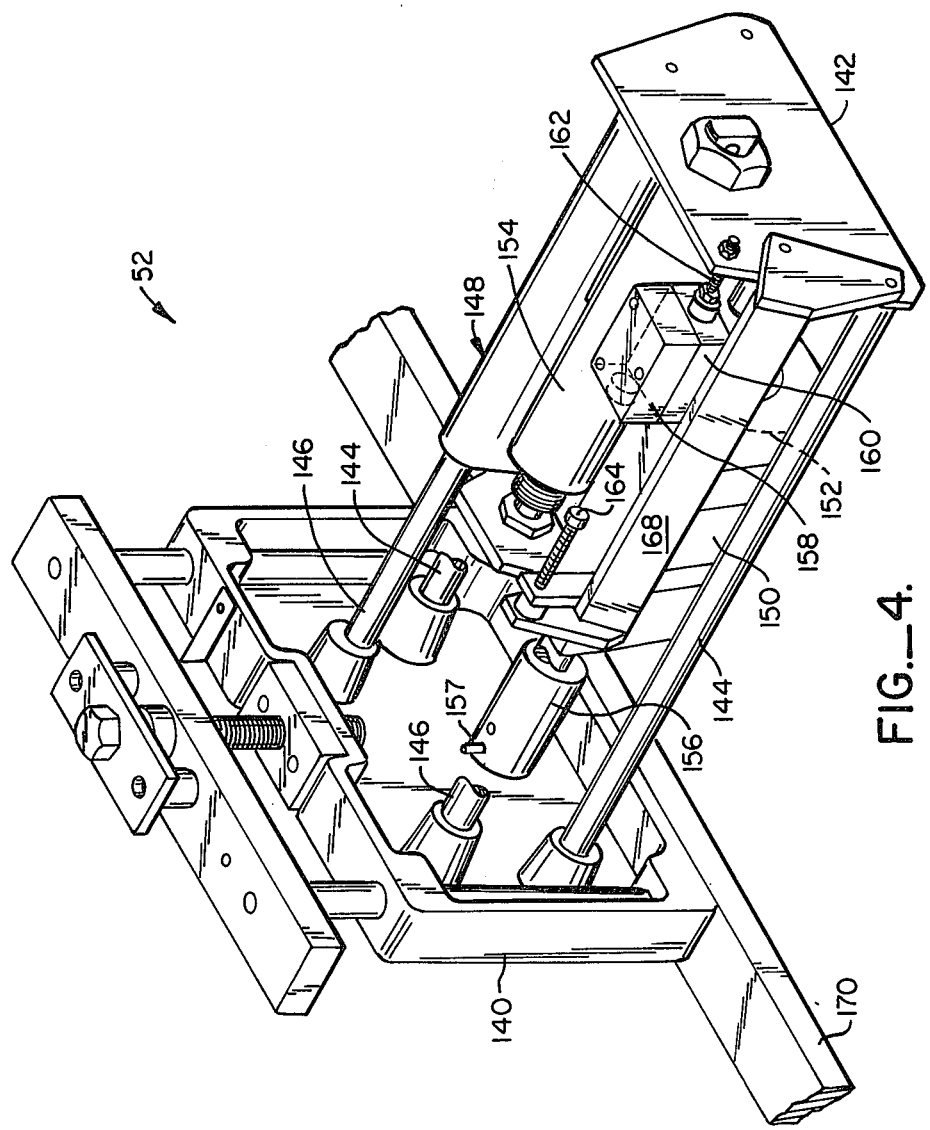
FIG._4.

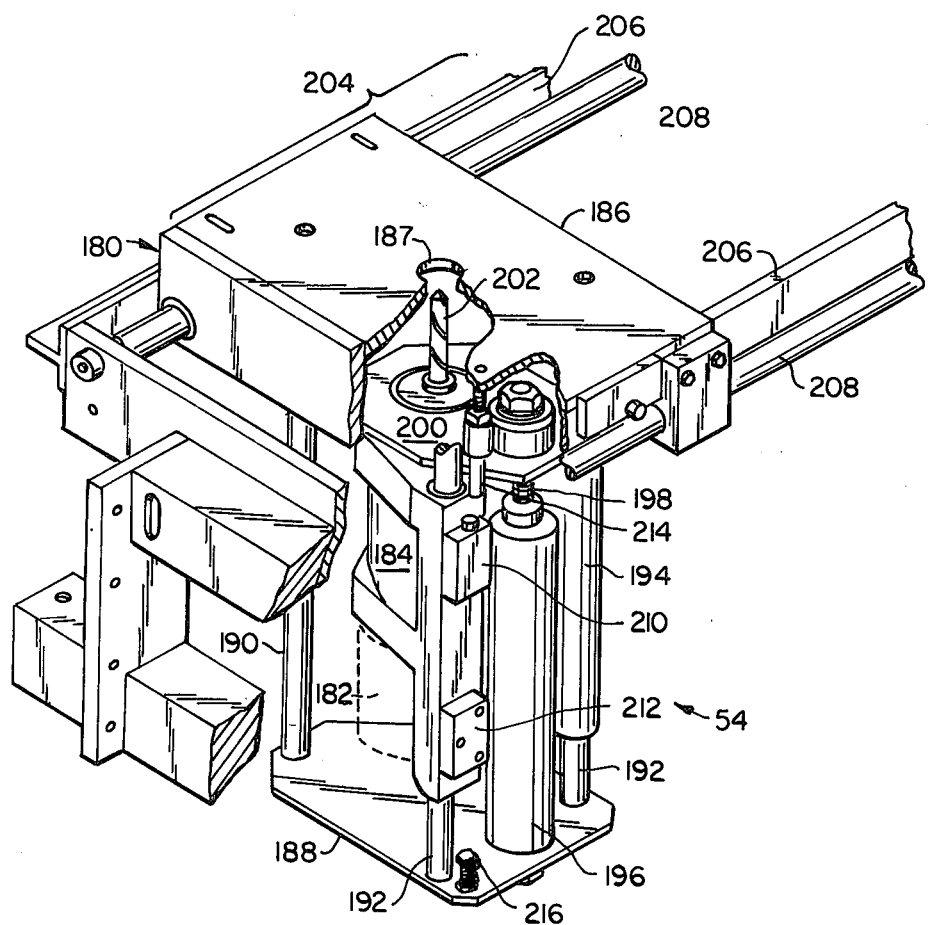
FIG._5A.

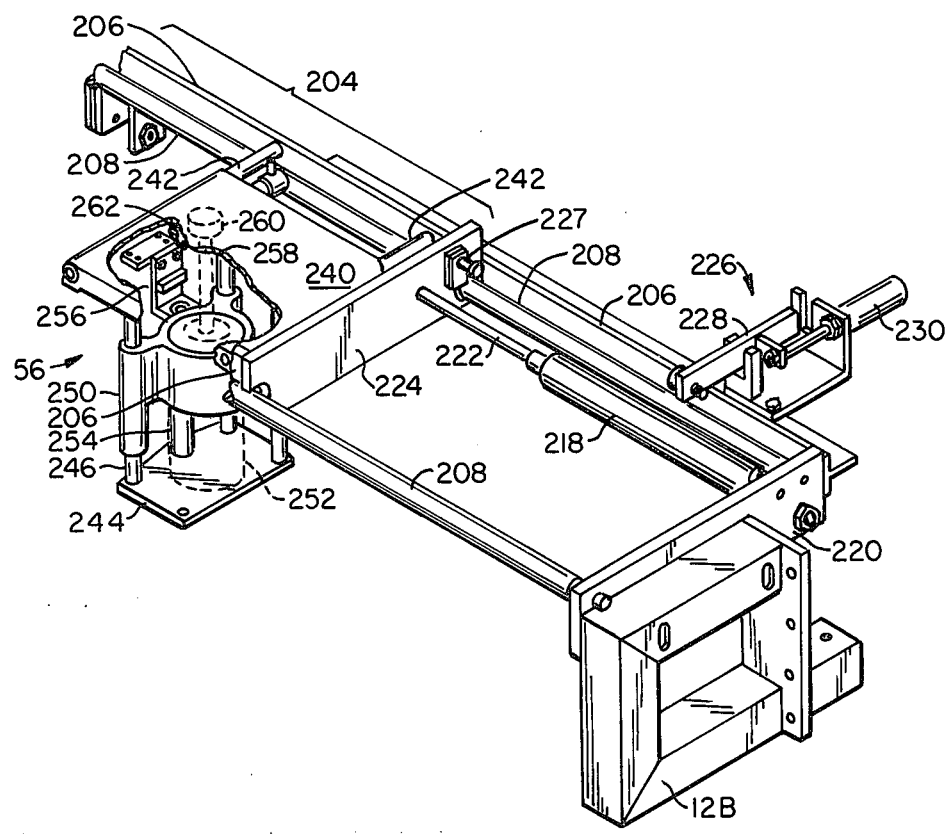
FIG._5B.

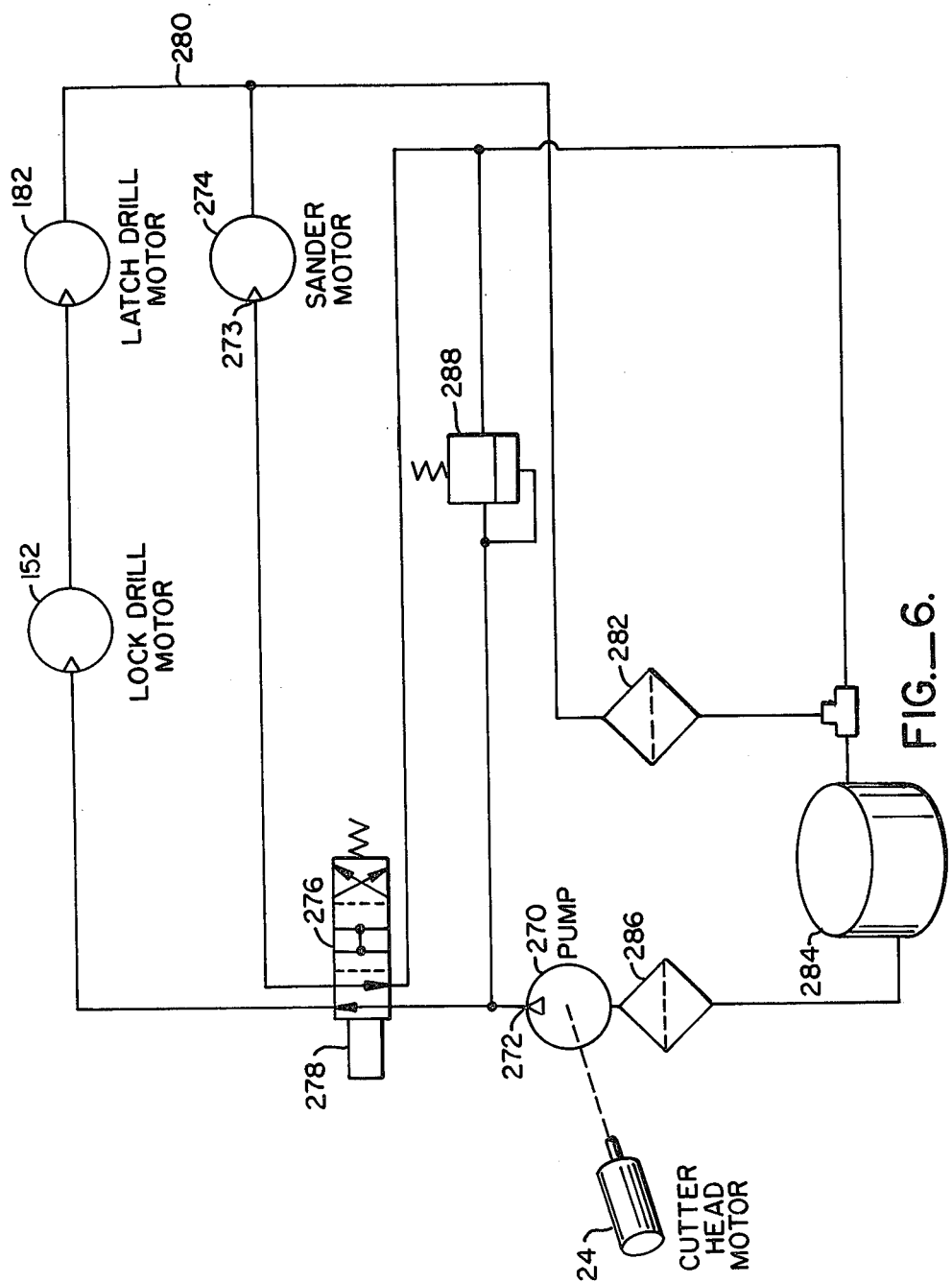

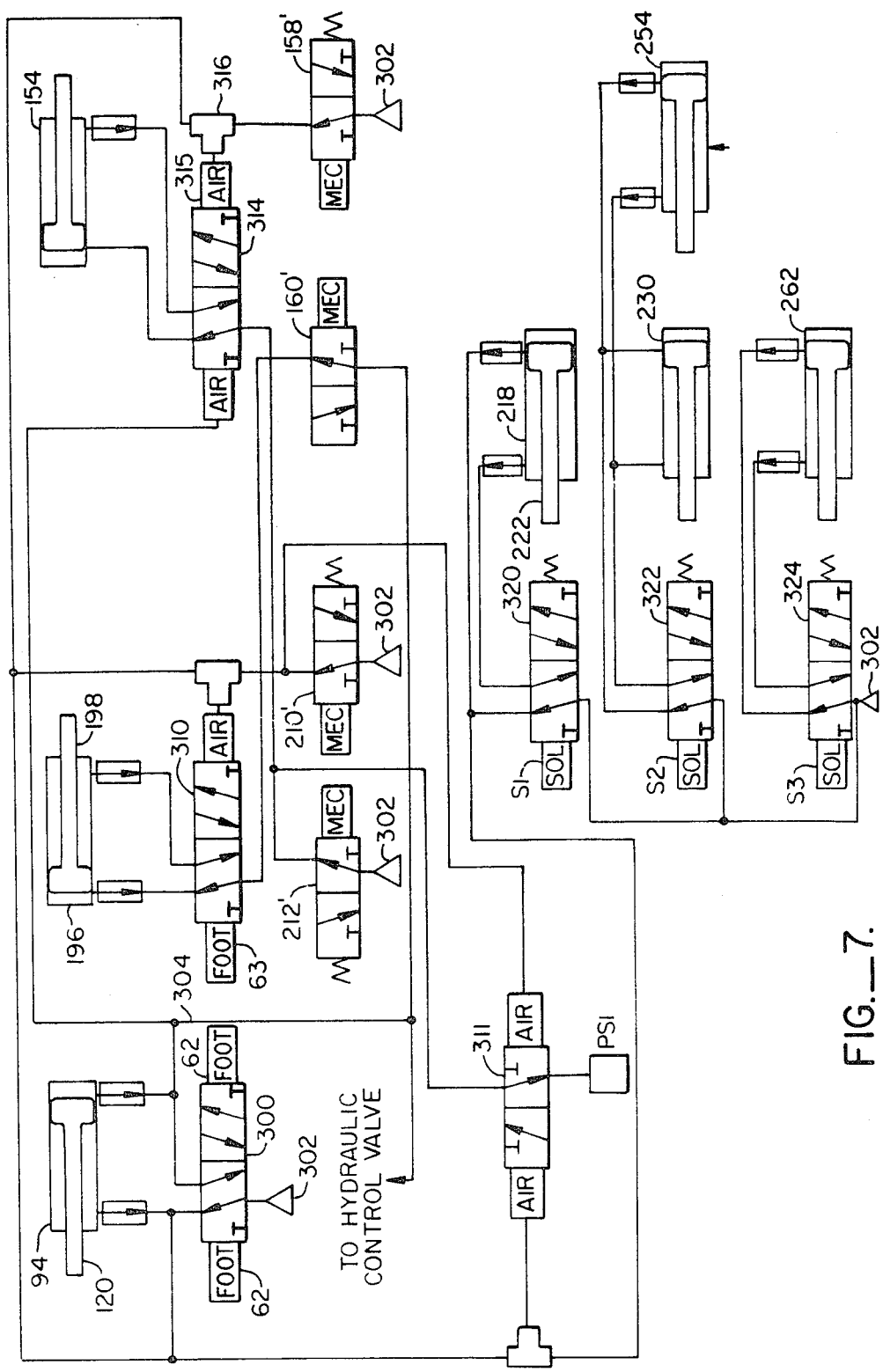

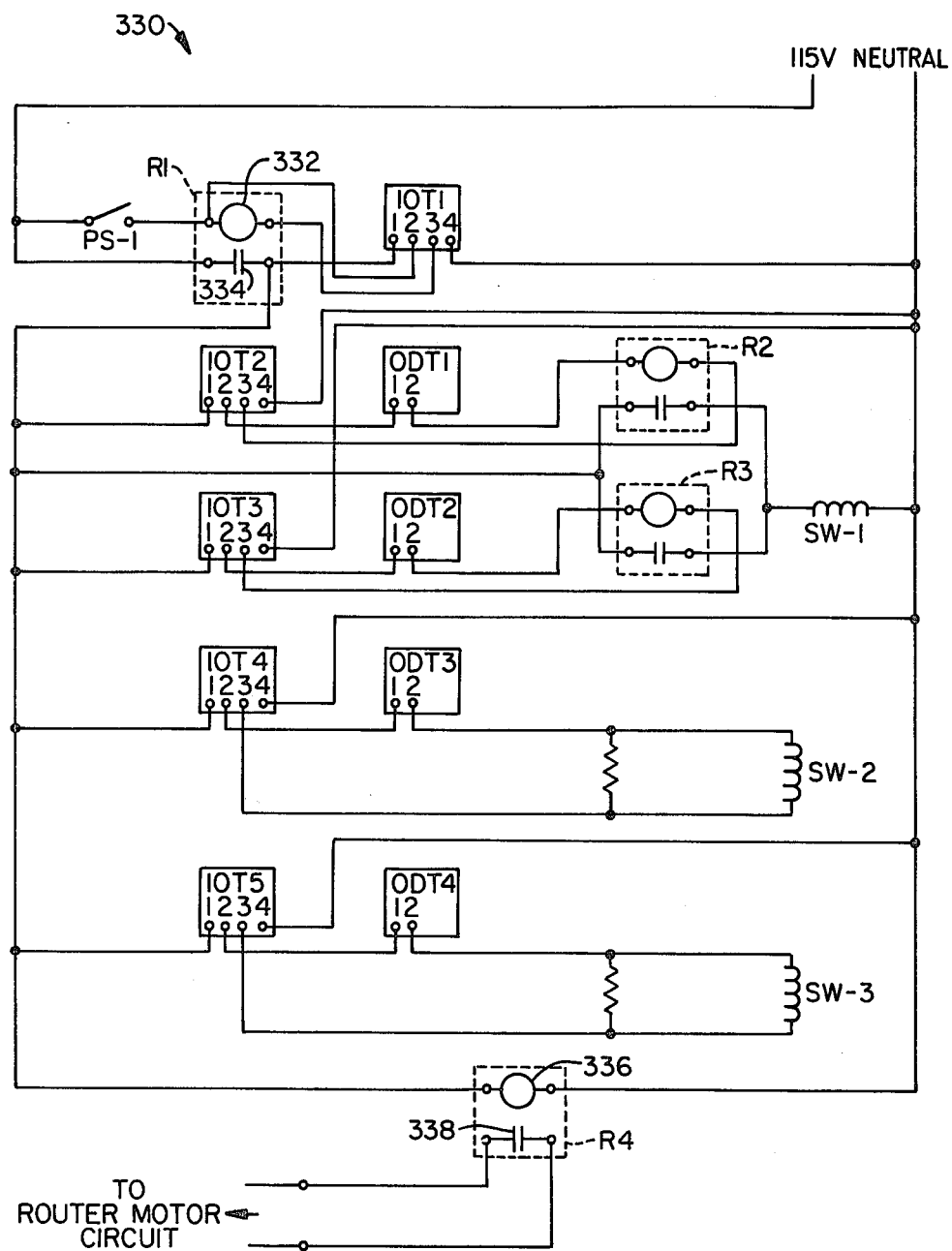
FIG._8.

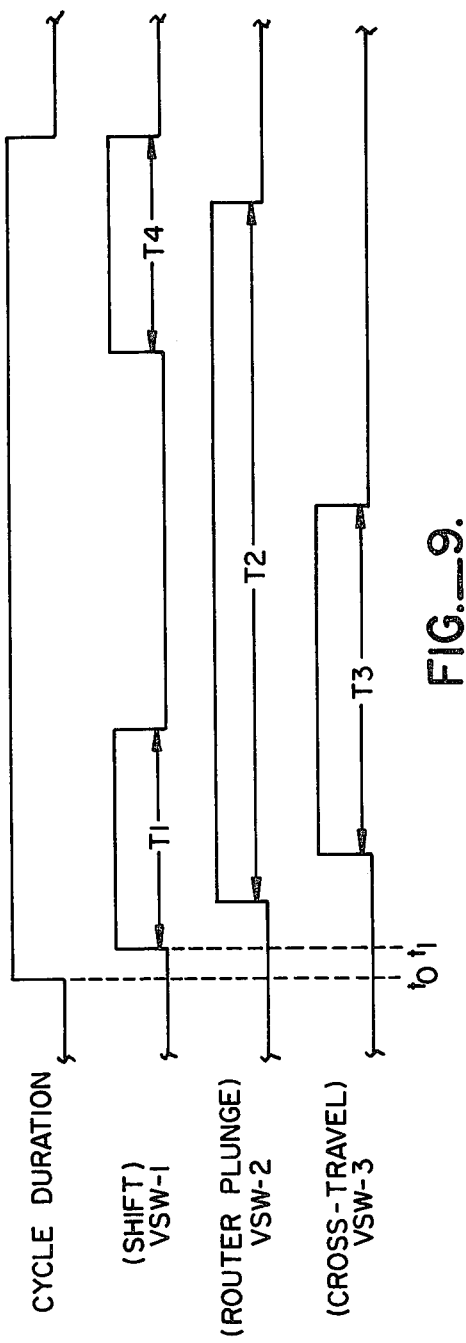
FIG._9.
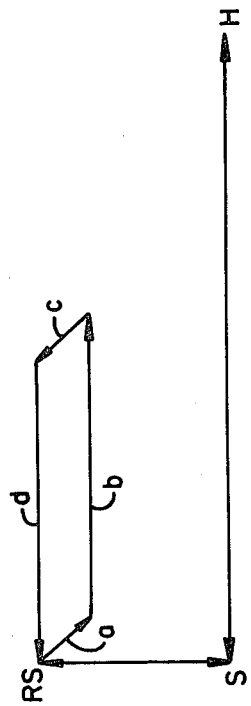
FIG._10.

DOOR PROCESSING MACHINE

This invention relates to a door processing machine that automatically prepares a door for hanging by sizing the door and drilling the lock bore, latch hole, and forming the face plate mortise therein.

In order to expedite the operation of hanging doors in a building, the construction industry has for some time adopted methods of precutting the doors to the desired size, so that the doors, after edging, will properly fit within the door frames. The doors themselves are usually of a proper length, but the door may not be of the proper width. In addition, the longitudinally extending edge of the door (the "free edge") that is opposite to the one that is to be hingedly connected to one of the jambs must be "eased" or cut to provide a slight bevel transversely thereof to facilitate movement of that edge to and from closed position of the door.

After the door is cut, sized and eased it must be provided with the latch and lock openings for the lock and for the spindle that carries the knobs; and, the free edge of the door must be routed to form the recess or face plate mortise that receives the face plate of the lock.

Heretofore, doors have been prepared by individually performing the necessary cutting, drilling, and chiseling operations necessary to cut the door to the proper width, to form the lock and latch openings in the door, and to chisel the face plate mortise. The time and expense of such labor added to the cost of a door.

More recently, machines have been available which allow an operator to manually operate, in sequence, various drill and router mechanisms used to form the required openings and recesses. Such machines reduced somewhat the time and expense of preparing a door, but there still was required manual operation and more operator surveillance than was desired. An example of such a machine can be found in U.S. Pat. No. 3,263,723.

Such machines have used separate electric motors to drive each of the various mechanisms used in the door preparation operation (i.e., cutters, sanders, and drills). And, it was found more efficient to use three-phase electric motors to power these mechanisms, because of the efficient operation of such motors, as compared to single-phase electric motors which find their advantage in high-speed operation. However, to capitalize on the efficiency of three-phase motors, they should be left running. If a three-phase motor is continuously turned on and off its operational efficiency is reduced; in addition, starter elements of the motor must be replaced more often.

Even though higher efficiency is obtained by leaving these three-phase motors running, they continue to consume power. An additional drawback is that the cutting implements which they drive are moving. This, together with the fact that the manual operation of the drilling and routing mechanisms of such machines called for operator intervention produces a situation that is ripe for operator error; a situation that can result in injury to the operator or in damage to the door (possibly making the door unsalvageable) or both if proper care is not exercised.

Summary of the Invention

The present invention provides a door preparation machine that sizes (i.e., cuts the door to a predetermined transverse dimension) and eases (i.e., bevels the free edge) the door; then, after the door is securely clamped in a drill station, the machine performs an operator-initiated automatic drilling/routing cycle in which the latch bore, the latch hole, and the face plate mortise are formed in the door without any operator intervention.

The machine includes a frame support that forms a work path for the door being prepared, including an input station and a drill station. Mounted to the frame support, proximate the input station, is a cutter element for edging and easing the door, a sander for finishing the edge, and feed wheels that move the door along a predetermined path from the input station to the drill station.

Also mounted to the frame support, proximate the work station, is a door clamp for securely holding the door during drilling and routing, and the drilling and routing elements.

The machine includes a hydraulic drive system, powered by an electric motor that also drives the cutter element, including hydraulic motors for the sander, lock drill, and latch drill. In addition, a logic system constructed from electrical and fluidactuatable elements functions to control the lock and latch drills, and the router elements so that they operate in a predetermined sequence, avoiding any operator intervention.

There are a number of advantages that can be seen as readily flowing from the present invention. First, automatic operation of the drilling and routing operations to obviate operator intervention will minimize the chances of injury to the operator. Such automatic operation also frees the operator to do other tasks, such as loading the next door to be prepared in the input station or routing the hinge butts for receipt of the hinges that attach the door to a doorjamb, while the drilling and routing operations are being performed by the machine. Thus, in addition to the time saved by the automatic operation itself (which will be described more fully in the detailed description), is the time saved by overlapping the tasks performed by the machine-operator pair.

As above noted, it is more efficient to keep the three-phase motors usually used in this type of door preparation apparatus in a powered state notwithstanding the fact that this results in a relatively significant power drain. The present invention, however, realizes a reduction of that power drain through the use of hydraulic forces that are developed by the motor that drives the cutter element. Thus, when no drilling or routing operations are being performed, little if any power will be consumed by the hydraulic motors that drive the drill and sander elements. When the drilling and routing operations are being performed, the cutter element motor is not needed for cutter operation, and therefore can be devoted entirely to driving a hydraulic pump that develops the hydraulic head for the (hydraulic) motors connected thereto.

Prior door processing apparatus has used a three-phase (5 H.P.) motor to drive the cutter element, a three-phase (1 H.P.) motor to drive the sander, a three-phase (2 H.P.) motor to drive the lock drill, and a three-phase (1 H.P.) motor to drive the latch drill. The present invention uses the same 5 H.P. three-phase motor to operate the cutter element, but also uses this motor to power the hydraulic system and indirectly drive the sander and lock and latch drills. The three-phase electric motors heretofore used for the sander, lock drill, and latch drill elements are deleted to realize a 4 H.P. reduction over that heretofore used.

Further, hydraulic motors typically consume only that amount of power needed to perform the task at hand. Thus, if it is contemplated that woods of varying hardness will be encountered, there is no need to use an electric motor of sufficiently high power (and concomitant high energy consumption) to drive a drill, for example, capable of penetrating the hardest wood.

These and other and further advantages of the present invention will become more readily apparent upon a reading of the following detailed description of the invention, and should be taken in conjunction with the accompanying drawings.

BRIEF DESCRIPTION OF THE DRAWINGS

FIG. 1 is a perspective view of a door processing machine incorporating the present invention;

FIGS. 2A and 2B are illustrative representations of certain of the door preparations performed by the machine of FIG. 1;

FIG. 3 is a perspective view of the door clamp assembly used in the machine of FIG. 1 to clamp, align and hold a door in the drill station for the drilling and routing functions that are to be performed by the present invention;

FIG. 4 is a simplified drawing of the lock drill assembly used in connection with the present invention;

FIGS. 5A and 5B illustrate the latch drill/face plate router assembly used for drilling the latch hole and for forming the face plate mortise in the door edge;

FIG. 6. is a schematic representation of the hydraulic system used for the hydraulic-powered elements of the present invention;

FIG. 7 is a schematic diagram of the pneumatic control logic used to sequence the drilling and routing operations of the present invention;

FIG. 8 is an electrical diagram illustrating the timer elements used for controlling the router to form the face plate mortise;

FIG. 9 is a timing diagram illustrative of the operation of the electrical circuit illustrated in the immediately preceding Figure; and FIG. 10 is a diagrammatic illustration of router travel.

DETAILED DESCRIPTION OF THE INVENTION

Referring to FIG. 1, there is illustrated a door processing machine incorporating the present invention, and generally designated with the reference numeral 10. As illustrated, the door processing machine 10 includes an input station A for receiving each door to be processed, and a drill or discharge station B where the door is clamped and held during drilling and routing operations, and from which the door is removed.

The door processing machine 10 itself generally includes a support frame 12, comprising the necessary structural elements (i.e., elongate angle irons and the means of attaching them to one another) to which can be attached the operating elements of the machine. These structural elements are not shown in detail, since it is well within the skill of the art to design and develop a variety of frame structures for holding the door processing elements, clamps, and other pieces of the door processing machine 10. It is sufficient to note here that the support structure/frame 12 is used to mount and hold the door processing elements, as well as to hold the door to be processed in an appropriate attitude.

Continuing with reference to FIG. 1, the input station A is shown as including an adjustable infeed bed 14 having an upper elongate horizontal surface 16 that supportively receives the door edge to be processed (i.e., that edge of the door to be beveled, sanded, and drilled—in a manner described more fully below). The infeed bed 14 is adjustable vertically by manual operation of an infeed height adjusting lever 18, together with linkage 20. Manual operation of the height adjusting lever will cause the infeed bed 14 to move vertically up or down, positioning any door resting on the support surface 16 for sizing. A more complete descriptive illustration of the assembly comprising the infeed bed 14, height adjuster lever 18 and connecting linkage 20 can be found in the publication entitled "Pro Model and Magnum Model Door and Jamb Machines", published by Norfield Manufacturing Company of 725 Entler Avenue, Chico, Calif. 95926, at pages 46 and 47 thereof.

Located at an inboard end of the infeed bed 14 is a cutter assembly 22, comprising a 5 H.P. cutter motor 24 rotatably attached to a cutter head 26. The cutter head 26 is encased in a vacuum shroud 28 which, in turn, is coupled to a vacuum fan (not shown) to draw away chips and sawdust created when a door is run across the cutter head during the sizing process.

Also located near the inboard end of the infeed bed 14, on the other side of the cutter assembly 22, are a pair of drive wheels 30 and 32, each driven by a single-phase electrical motor 34 and 36, respectively. Located intermediate of the two drive motors are sanding wheels 38 and 40, both of which are driven by a hydraulic motor (FIG. 6) and appropriate connecting linkage. The cutter assembly 22, drive wheels 30 and 32, and the sanding wheels 38 and 40 are housed within a power-feed cover 42 (illustrated in phantom) to protect the operator, as well as the elements themselves.

Located generally above the path that will be traveled by a door being processed—formed by the input and drill stations A and B—is a butt router arbor 43, including mounting posts 44 and main bar 45 carrying a butt router assembly 46 and left and right stops 47 and 48, respectively. The butt router arbor 43 functions to clamp and hold, in a holding pan 49, a hinge jamb in predetermined adjacent relation with the edge of the door that is to be connected therewith, the door being clamped in the drill station B. So held, the operator can easily use the router assembly 46 to route out the hinge butts for receipt of the hinges, to thereby hang the door to the jamb.

Also mounted to the main bar 43 are nylon rollers 41 which are formed to have an edge-receiving notch so that when a door is placed on the infeed bed 14 with its transverse dimension vertically oriented, the edge of the door to be hinged to a doorjamb is received by the rollers 41, holding the door in a vertical orientation, with its longitudinal dimension parallel to the infeed bed 14.

The drill station B of the door processing machine 10 (FIG. 1) is shown as including a door clamp assembly 50. The clamp assembly 50 itself is housed behind a clamp shroud 51, and therefore not specifically seen in FIG. 1. It is, however, illustrated in detail in FIG. 3, and will be discussed with that Figure. Also hidden by the clamp shroud 51 is a lock drill assembly 52 (illustrated in FIG. 4). Beneath the clamp assembly 50, as viewed in FIG. 1, is latch drill assembly 54 and face plate router mechanism 56. These latter elements of the work station B are respectively illustrated in FIGS. 5A and 5B and will be described in greater detail with reference to those Figures below.

The invention is used to prepare doors for prehanging by "sizing" or otherwise cutting a door to a predetermined transverse dimension, "easing" the free longitudinal edge of the door (i.e., that edge of the door containing the lock and latch mechanism) so that it opens and closes easily within the doorjamb, and forming the lock and latch openings for receiving the doorknob spindle and latch bolt, and forming the face plate mortise in the edge of the door for receiving the face plate.

Processing the door is generally performed in the following manner: A door is placed by an operator in the infeed station A so that its free edge (i.e., that longitudinal edge of the door that will not be hinged to the doorjamb) rests on the support surface 16 of the infeed bed 14. The operator manipulates the infeed height adjusting lever 18 in a manner that positions the infeed bed 14, and the door then resting thereon, vertically and relative to the cutter head 26 of the cutter assembly 24. This adjustment establishes the amount to be removed from the door by the cutter assembly 22. The operator then manually slides the door (no more than approximately one foot) along the support surface 16 of the infeed bed 14 until it is captured by the first drive wheel 30. At this point the drive wheel 30, together with drive wheel 32, will take over movement of the door from the infeed station A to the drill station B, causing the door to be drawn across the cutter head 26 edges and pulled across the sanding wheels, and into the drill station B.

As the door is moved across the cutter head 23, the edge is cut and beveled approximately three degrees, as illustrated in FIG. 2A. At the same time, the sanders will sand off the sharp edges 58 and 60 created by the cutting operation.

The end of the cutting and sanding operation will find the edged and eased door in the drill station B. The operator then shifts the door either left or right, depending upon whether it is a left or right opening door (which determines the location along the edge at which the lock and latch openings are to be formed), against one of the stops 47, 48. Once the operator properly positions the door, he or she will step on the clamp treadle 62 (FIG. 1) which operates the door clamp assembly 50, causing the door to be clamped, positioned, and held, relative to the lock and latch drill assemblies 52, 54, respectively, for the drilling operation. When the operator notices that the door is securely clamped, he or she will initiate the automatic drilling operation (which, as will be seen below, cannot be initiated unless the door is first clamped) by foot treadle 64. Thereupon, a latch hole 66, lock hole 68, and face plate mortise 70 (as illustrated in FIG. 2B) will be formed in the door.

Turning now to FIG. 3, the clamp assembly 50 is illustrated in greater detail in FIG. 3. As shown the door clamp assembly 50 includes an elongate back plate 80 that cooperatively operates with clamp shoes 82 to grip and hold a door at its free edge. To protect door surfaces, the back plate 80 is provided with vinyl pads 84. Located approximately in the center of the clamp back plate 80, and in the surface that confronts a door during clamping, is a drill back-up block 88 fabricated from high-density particle board. The back-up block 88 forms a back stop for the lock drill to prevent the door from splintering when the drill passes through to form the lock opening.

Movement of the clamp back plate 80 and clamp shoes 82 into and out of gripping engagement with a door is effected by left and right rack gear assemblies 90, 92, respectively, powered by a pneumatic air cylinder 94. The rack gear assembly 90 (rack gear assembly 92 is similarly structured) includes a support post 96 and support bar 98 which function to hold slide tubes 100 and 102. The slide cylinders 100 and 102 respectively and slidably retain clamp shoe arm 104 and clamp plate arm 106. One of the ends of the clamp shoe and clamp plate arms 104, 106 are respectively attached to the clamp shoes 82 and clamp plate 80, as illustrated. The other ends of the clamp shoe and clamp plate arms carry gear racks 108 which are spaced in opposing relation and positioned in operative relation with a pinion gear 110. Pinion gear 110, in turn, is mounted proximate the distal end of a torque shaft 112 which, in turn, is held fixably mounted to the gear rack assembly 90 by support plates 114, in which the torque shaft 112 is journalled.

The pneumatic clamp cylinder 94 is attached to the support post 96 by an extension element 116, which is connected to the bottom portion of the support post 96 and extends therefrom to connect to a tailpiece 118 of the clamp cylinder 94. In addition, a piston arm 120 is pivotally attached to one end of a piston link 122, the other end of which is connected to an end of the torque shaft 112, as illustrated in the Figure (FIG. 3).

The clamp assembly 50 is mounted to the support frame 12 so that it "floats," allowing it to accurately position even a warped door to ensure that the drilling operations are performed in the proper locations of the door. Thus, the clamp assembly 50 is swing-mounted to the support frame 12 by clamp mounts 124 which are provided with apertures 126 for receiving pivot arms 128. The pivot arms are fixedly attached to extension members 130 (shown in phantom) which in turn are a part of the support frame 12. This arrangement allows the clamp assembly to freely swing on the pivot arms 128 so that when clamping a door that may be slightly warped, the door is pulled into, and fixedly held in, a position that ensures that the openings will be formed in the door at the appropriate locations.

The clamp operates as follows: The pneumatic clamp cylinder 94 is provided with a source of air to cause the piston arm 120 to move out of the cylinder. This outward movement translates, via the piston link 122, into a counterclockwise rotation (as viewed in FIG. 3) of the torque shaft 112 and therewith the pinion gear 110. Pinion gear 110, in turn, operates the associated rack gears 108 to cause the clamp shoe arm 104 to move clamp shoe 82 toward the clamp back plate 80 and to cause the clamp plate arm 106 to move the clamp plate 80 toward the clamp shoe 82. A door situated between the clamp back plate 80 and clamp shoes 82 is securely gripped between the clamp plate 80 and clamp shoes 82 and held during the remaining drilling and routing operations (which will be described below).

The particular arrangement used to effect the clamping action also functions to center a door over a predetermined location—regardless of door thickness. Since the clamp plate 80 and clamp shoe pair move the same distance—toward each other—a door captured therebetween will always have its (longitudinal) center positioned over one location—in this case the drill 202 (FIG. 5A) of the latch drill assembly 54, which is located beneath the clamp assembly 50. Thus, the clamp assembly 54 is provided with self-centering capability.

Turning now to FIG. 4, there is illustrated the lock drill assembly 52 which is shown as including spaced front and back plates 140 and 142, respectively, held in fixed relation by support rods 144 and slide rods 146. Mounted to slide along slide rods 146 is a drill carriage 148, comprising a bearing housing 150, hydraulic motor 152 and pneumatic drill cylinder 154.

The hydraulic drill motor 152 drives a lock drill 156, which is positioned to extend through an aperture 157 formed in the front plate 140. Forces encountered by the lock drill 156, particularly those that would be transmitted along the longitudinal dimension of the drill, are buffered by a bearing assembly (not shown) housed within the bearing housing 150 and, thereby, kept from being applied to and damaging the hydraulic drill motor 152.

The drill carriage is movable from the position shown in FIG. 4 (adjacent the back plate 142) to a second position closer to the front plate by the drill cylinder 154. When so moved, the lock drill is moved through the front plate 140 (which is positioned in confronting relation with clamp plate 50, as illustrated in phantom in FIG. 3) and into (and through) any door then held by the clamp assembly 50.

The limits of drill carriage travel are established by limit sensors 158 and 160, which are mounted to the drill carriage 148, and which include manually depressible buttons for engagement with adjustable sensor stops 162 and 164, respectively. The sensor stop 164 is positioned by the stand 168 which mounts to the back plate 142 of the lock drill assembly 52.

The lock drill assembly 52 mounts to the support frame 12 (FIG. 1) by attaching the front plate 140 to cross bar 170 by any attachment means such as, for example, a bolt and nut assembly. The cross bar 170 is a part of the frame structure that forms support frame 12 and may assume any configuration.

Turning now to FIG. 5A, there is illustrated in greater detail the latch drill assembly 54, showing it as including drill support structure 180 for mounting a hydraulic latch drill motor 182 (shown in phantom) and bearing assembly 184. The drill support structure 180 comprises a mounting plate 186, a bottom plate 188, support rods 190, and slide rods 192. The bearing assembly 184 includes (similar to that of the lock drill-FIG. 4) a bearing housing 194 that is constructed to be slidably mounted on the slide rods 192 for movement between the mounting plate 186 and the bottom plate 188 by a pneumatic latch drill cylinder 196. The cylinder arm 198 of the latch drill piston 196 is connected to the bearing assembly 184 via connecting plate 200.

The drill motor 192 and bearing assembly 184 are fixedly mounted to one another, with the bearing assembly including a conventional thrust bearing (similar to that used in the lock drill assembly 52) that accepts the force that would be normally imposed upon the drill motor 82 during drilling operation. The drill support structure 180 forms a part of a drill/router (D/R) carriage 204, which includes the mounting plate 186 that is attached to elongate arm elements 206 (which are, in turn, connected to the support structure of the router mechanism 56—FIG. 4B—as will be discussed below). The D/R carriage 204 is slidably mounted to slide rods 208 and movable therealong, as will be discussed further below.

Returning specifically to the latch drill assembly 54, the drill motor 182 and bearing assembly 184 combination are, as noted above, mounted to the slide rods 192 for movement between positions: One position adjacent the bottom plate 188 and a second position adjacent the mounting plate 186 of the drill support structure 180. Upper and lower limits of travel are sensed and limited, in much the same manner as that of the lock drill assembly, by sensor switches 210 and 212 which cooperatively engage upper and lower stops 214 and 216.

When a door to be prepared is positioned in the drill station B and clamped by the door clamp assembly 50 (FIG. 1), the free end of the door will be positioned immediately above the drill assembly 50. Accordingly, when the latch drill cylinder 196 is actuated to move the bearing assembly 184/motor 182 combination upward toward the mounting plate 186, so that the drill element 202 projects through the aperture 187 of the support plate 186 and into the free edge of the door, forming the latch hole.

The D/R carriage 204 has two end sections. One end section carries the latch drill assembly 54 as shown in FIG. 5A. The remaining end section is illustrated in FIG. 5B, and shown as carrying the router mechanism 56. As indicated above, the D/R carriage 204 functions to shift the latch drill assembly 54 away from a location beneath the door at which a latch hole is formed in the door's free edge, shifting into that location the router mechanism 56 for forming the face plate mortise. Movement of the D/R carriage 204 is effected by the pneumatic carriage cylinder 218, the base of which is attached to the carriage mounting plate 220 (in turn mounted to the frame structure 12B, a portion of the overall frame structure 12). A cylinder arm 222 of the carriage cylinder 218 is attached to the back plate 224 of drill/router carriage 204.

Referring for the moment to FIG. 10, there is diagrammatically illustrated the path taken by the face plate router mechanism 56 during its operation. Generally, it is moved from a home (H) or unshifted position to a shifted (S) position, raised to an upper shift position (US), and then moved along the arrows labeled a, b, c and d, returning to the US position.

Travel of the router mechanism 56 along the paths b and d of FIG. 10 is effected by controlled operation of the carriage piston in combination with a stop mechanism 226. Stop mechanism 226 includes a stop bar 228, and pneumatic cylinder 230. When the router assembly 56 is moved into location for routing (i.e., along the path from H to S) the stop cylinder 230 is actuated, as will be described below, in turn moving the stop bar 228 to the position illustrated in FIG. 5B (the stop bar is initially retracted so as not to impede movement of the D/R carriage 204). The router assembly 56 is raised, moved along the path designated by arrow a (FIG. 10), and the carriage piston 218 deactivated to pull the D/R carriage 204 backward toward the (now extended) stop bar 228. Travel of the D/R carriage 204 terminates when the stop bar 228 contacts the stop post 227 mounted to the cross bar 224. Thus, during the routing operation (which will be described more fully below) the router travel is, for a time, limited to that movement illustrated in FIG. 10 by the arrows b and d.

Returning now to FIG. 5B, and specifically to the router mechanism 56, the mechanism is shown as including a cross travel plate 240 that is slidably mounted to slide rods 242 which are attached to and extend between the support arms 206 of the D/R carriage 204. Attached to the cross travel plate 240, and extending downward therefrom to a bottom plate 244 are slide rods 246 and a support rod 248. Slidably mounted on the slide rods 246 is a motor casting 250, which holds the router motor 252 (illustrated in phantom for clarity of other features). Movement of the motor casting 250 is effected by a (pneumatic) router piston 254, which is attached to the bottom plate 244 and (by the piston arm—not shown—of the router piston 255) to an attachment bracket 256. The attachment bracket 256 is, in turn, connected to the motor casting 250.

The cross travel plate 240 is apertured at 258 so that the shank that carries a router head 260 can extend therethrough from the chuck of the router motor 252.

Cross travel of the cross travel plate 240, i.e., travel along those paths represented by the arrows labeled a and c in FIG. 10, is effected by a pneumatic cross travel piston 262, one arm of which is connected to support arm 206, and the piston arm thereof (not shown) is connected to the cross travel plate 240.

The different power-driven elements (i.e., the sander, various drills, power wheels and router) utilize the following motor elements: The cutter head 26 is driven by a cutter head motor 24 which is a three-phase, 5 H.P. motor. The motors 34 and 36 that run the infeed drive wheels are each single-phase, ¼ H.P. motors, and the motor used to power the router (used because of the high RPM requirement of router operation) is a 1½ H.P. single-phase motor.

The lock drill, latch drill, and sander, however, are driven by hydraulic motors, and a schematic illustration of the hydraulic system is shown in Fig. 6. The reason for this is as follows: The cutter head motor 24 is operative only during the time the door is being edged. When the door has passed from the infeed station A to the drill station B, no load requirements are placed upon the motor. Accordingly, the available power of the power head motor 24 is used by the present invention to drive a hydraulic pump that, in turn, develops the necessary hydraulic head for the lock and latch drill motors. Thus, the cutter head motor is coupled to a hydraulic pump 270 (FIG. 6) by conventional V-belt coupling (not shown). The output port 272 of the hydraulic pump is communicated, via a control valve 276, to the input 273 of a hydraulic sander motor 274, and to the series-connected hydraulic lock and latch drill motors 152 and 182, respectively. Control valve 276 is an air-actuated spring-biased valve of conventional construction that receives an air signal at input 278 to bias the valve to the position indicated, causing the hydraulic power generated by the hydraulic pump 270 to be communicated to the lock and latch drill motors 152 and 182, respectively. The normal position of the control valve 276, when the air signal is not applied to the input 278, communicates the hydraulic pressures generated by the hydraulic pump 270 to only the sander motor 274.

Inherent in the operation of hydraulic pumps is that they will utilize the hydraulic forces applied thereto only when a load is applied; otherwise, they merely act as a conduit of low fluid restriction. Thus, for example, as will be seen below the lock bores and latch holes are not drilled at the same time. During the drilling operation of one, the drill motor of the other is unloaded. Accordingly, the full power generated by the hydraulic pump 270 is available to that particular motor presently under load.

A return line 280 returns the hydraulic fluid (via a return filter 282) to a hydraulic tank assembly 284, from which the fluid is drawn by the hydraulic pump 270 via a suction filter 286. Finally, a pressure relief valve 288 couples the output line from the hydraulic pump 270 to the tank.

OPERATION

Controlled operation of the door processing machine 10 is effected by applying a fluid supply (e.g., air) at predetermined times, and in a predetermined manner, to the various fluid-actuatable cylinders that are used to provide the motive forces for the moving elements of the machine. In addition, electrical timing devices are used to control electrical solenoid units which, in turn, function to operate various control valves—again with the idea of operating various fluid-actuated cylinders. FIG. 7 is a schematic diagram of the pneumatic system used to form the logic that controls the machine's sequence of clamping, drilling and routing operations. As can be seen by those skilled in the art, the described embodiment makes use of commercially available pneumatic valves capable of being manually, mechanically or air to selectively communicate a fluid (air) supply to the various fluid-actuatable cylinders used by the door processing machine 10. Thereby, logical decisions can be made to effect a controlled sequence of operation.

When a door is moved from the infeed station A of the door processing machine 10 to the drill station B, the operator aligns the door with the particular one of the stops 47 or 48 and depresses foot treadle 62 (FIG. 1). Foot treadle 62 actuates fluid valve 300 (FIG. 7) to cause it to communicate an air supply 302 (which would be in the form of an air compressor—not shown) to the clamp cylinder 94. This, in turn, will cause the piston arm 120 (FIGS. 3 and 7) to operate the door clamp assembly 50 to capture and hold the door in fixed relation to the various drilling and routing elements.

The fluid supply 302 is also communicated by the control valve 300 and air line 304 to the input 278 of hydraulic control valve 278 (FIG. 6). This action initiates operation of the lock drill and latch drill motors by switching the hydraulic head produced by the hydraulic pump 270 from the sander motor 274 to the lock and latch drill motors 152 and 182. The lock and latch drill motors will continue to run until the foot treadle 62 is again depressed, terminating communication of the air supply 302 by fluid valve 300, and deactuating the clamp assembly 50 to release the door. Note that the latch and lock drills will not operate unless the clamp assembly is actuated to secure the door in position.

Once the door has been clamped, it is ready for the automatic latch hole, lock bore and face plate mortise forming operations. The drilling and routing cycle is initiated by the operator by depressing the foot treadle 63 to cause the air supply to be communicated to the latch drill cylinder 196 via the lock drill sensor valve 160 (which will be in its mechanically actuated position when the lock drill is in a non-drill position, see FIG. 4) and a fluid valve 310 (which is actuated by foot treadle 63). This actuates the latch drill cylinder 196 (FIGS. 5A and 7), causing the piston arm 198 to extend and move the drill 202 of the latch drill assembly 54 into the door, forming the latch hole. Outward movement of the piston arm 198 from the latch drill cylinder 196 ceases when the sensor switch 210 contacts sensor stop 214, causing actuation of the sensor switch 210 which, in turn, applies an air signal to the control valve 310. Control valve 310 reverses to cause the latch drill cylinder 196 to retract piston 198 until the latch drill is in its return or home position. So positioned, the sensor switch 212 is actuated by engagement with the sensor stop 216 (FIG. 5A) to open communication of air supply 302 for actuation of the lock drill cylinder 154 via control valve 314. At the same time, the air supply 302 is applied, via the sensor 212, to actuate the start control switch PS1 (FIGS. 7 and 8) to initiate operation of the electrical timing circuit 330 (FIG. 8). Routing operation commences by shifting the latch drill assembly 54 out of, and the router mechanism 56 into, location for forming the face plate mortise in the free end of the door. This will be described more fully below.

Referring for the moment to FIGS. 4 and 7, actuation of the lock drill cylinder 54 will commence movement of the drill carriage 148 toward the front plate 140. The lock drill 156 thereby is caused to protrude through the front plate 140 to drill through the door (which is positioned adjacent to and parallel with the front plate 140), forming the lock bore. Movement of the drill carriage 148 continues until the sensor switch 158 engages sensor stop 164, causing actuation of the lock sensor. Sensor switch 158 switches to communicate the air supply 302 to input 315 of control valve 314 (via shuttlecock 316). Control valve 314 deactivates the lock drill cylinder 154 to cause its associated piston arm to retract, returning the drill carriage 148 to its home position adjacent bottom plate 142.

Turning now to FIGS. 5B, 7, 8 and 9, router operation and control can now be described. First, FIG. 8 is a schematic diagram of the electrical control circuitry used to selectively apply 115 VAC power to solenoid windings SW-1, SW-2 and SW-3 (FIG. 8) to operate solenoids S1, S2 and S3 (FIG. 7) which, in turn, function to respectively actuate control valves 320, 322 and 324. Actuation of control valve 320 communicates the supply 302 to the carriage piston 218 (FIGS. 5B and 7) to effect movement of the D/R carriage 204. Thereby, the face plate router mechanism 56 is moved into position.

After a predetermined amount of time—sufficient to allow the face plate router mechanism 56 to be properly located relative to the door—the electrical timing circuit 330 of FIG. 8 activates the solenoid S2 (FIG. 7) which, in turn, actuates control valve 322 to apply the air supply 302 to the stop cylinder 230 and router cylinder 254 (FIGS. 5B and 7). This causes the stop bar 228 to be moved outward, away from the cylinder 230 (FIG. 5B), and raises router motor 252) moving the router 260 into routing engagement with the door (which would be situated immediately above and overlying the cross travel plate 240).

A short time after the router 260 has been raised, the electrical timing circuit 330 activates the solenoid S3 which, in turn, actuates the control valve 324 (FIG. 7). This causes the cross travel cylinder 262 to move the cross travel plate 240 (FIG. 5B) in a direction transverse the free edge of the overlying door, and with it the router 260. Thereafter, the solenoid S1 is deactivated and the control valve 320 returned to its deactuated position, causing the carriage piston 218 to retract the piston arm 222. The D/R carriage 204 is moved toward the cross plate 220 (FIG. 5B) until it is stopped by the stop bar 228. During this movement, of course, the router 260 has been forming a portion of the required face plate mortise.

Next, the solenoid S3 is deactivated, deactuating control valve 324 to cause the cross travel piston to retract its associated cylinder arm, moving the router 260 in a transverse direction opposite that initially moved.

Then, the solenoid S1 is activated, control valve 320 thereby actuated, to again actuate the carriage cylinder 218. The D/R carriage 204 is again moved to an extended position, and along with it router 260. The solenoid S2 is then deactivated, deactuating control valve 322 and with it the stop piston 230 and router piston 254, moving the stop bar 228 out of the line of travel of the D/R carriage 204 and moving the router 260 away from the door.

Finally, the solenoid S1 is again deactivated, causing deactuation of the carriage piston 218 to return the face plate router mechanism 56 to a position adjacent the support frame portion 12B, and moving the latch drill assembly into position for drilling the latch hole in the next door to be finished.

To briefly review the automatic operation, foot treadle 63 is depressed, initiating the following cycle: The latch drill assembly 54 is operated, under the pneumatic control circuitry illustrated in FIG. 7 to drill the latch hole. Upon completion, the latch drill is moved out of the way and the face plate router mechanism 56 moved into position and controllably operated to follow the rectangular path designated by the arrows a, b, c and d (FIG. 10) to form a face plate mortise. The router mechanism is then returned to its original (unshifted) position. At the same time the face plate routing operation is taking place, the lock drill assembly is operated to drill the lock bore in the door. Thus, by operatively controlling the lock drill assembly 52, the latch drill assembly 54, and face plate router mechanism 56, the time is significantly reduced.

Turning now to FIG. 8, the electrical timing circuit 330 used to control the solenoid valves S1, S2 and S3, and ultimately the path (FIG. 10) traveled by the router 260 (FIG. 5B), is shown as including five interval-on-timers (IOT1-IOT5), four on-delay-timers (ODT1-ODT4), circuit relays R1, R2 and R3 connected to selectively apply 115 VAC power to solenoid windings SW-1, SW-2 and SW-3 of the solenoids S1, S2 and S3 (FIG. 7) for predetermined time periods when the cycle start pressure switch PS-1 is momentarily closed in response to air supply 302 (FIG. 7) being conducted thereto by control valves 212 and 311. The electrical circuit 330 also includes a motor start relay R4 that functions to turn on and off the electrical motor 252 (FIG. 5B) used to drive the face plate router 260.

The interval-on-timers (IOT1-IOT5) and the on-delay timers (ODT1-ODT4), are solid-state timing modules commercially available from R-K Electrical Co., Inc., 11315 Williamson Road, Cincinnati, Ohio 45241. The interval-on-timer timing modules are designated with the Model No. MCS-120A-3S; the on-delay-timer timing modules are designated by the Model No. MDS-120A-3S. The interval-on-timer timing module is used to communicate an applied electrical current to a load for a predetermined time. Thus, when a 115 VAC line, and its return or neutral, are respectively connected to terminals 1 and 4, a load connected across terminals 3 and 4, application of 115 VAC power to the 115 VAC line will cause the timing module to energize the load. At the end of a timing set cycle, the load is de-energized and will remain so until the 115 VAC input power is removed and reapplied. Interval-on-timers IOT1-IOT5 are examples of this configuration.

An alternative timing module, the on-delay-timer, functions to delay energization of a load. The 115 VAC line is connected to terminal 1 of the module and the load is connected between terminal 2 and a neutral. Applying 115 VAC power to the 115 VAC line will energize the load at the end of the timed period. The load is de-energized when power is removed —which also resets the timing circuit. The on-delay-timers ODT1-ODT4 are examples of this configuration.

Illustrated in FIG. 9 are the pertinent waveforms, CYCLE DURATION, VSW-1, VSW-2 and VSW-3, generated by the electrical timing circuit 330. The CYCLE DURATION waveform represents the period, which is approximately 20 seconds, within which the 115 VAC voltage is applied by IOT1 to the remaining circuit elements. The waveform VSW-1 similarly represents the time periods (T1 and T4) that 115 VAC power is applied to the solenoid winding SW-1 of the solenoid S1 (FIG. 7) by the pairs of modules IOT2/ODT1 and IOT3/ODT2. The relays R2 and R3 in the circuit of the solenoid winding SW-1 operate to prevent 115 VAC power applied by one of the on-delay timers ODT1 OR ODT2 being communicated to the other.

Operation of the electrical circuit 330 is initiated when, during execution of the drilling/routing cycle, the pneumatically operated pressure switch PS1 (FIGS. 7 and 8) is closed in response to an air signal being conducted thereto via control valve 311 (FIG. 7). PS1 closure applies 115 VAC power to the interval-on-timer IOT1 and across the windings 332 of relay R1. Contacts 334 of relay R1 close. Closure of the pressure switch PS1 is only momentary; however, closure of the contacts 334 of relay R1 functions to provide a current path for the 115 VAC power, via the interval-on-timer 1 (until its preset time period expires) which continues application of power across the relay windings 332. Thus, relay R1 is latched until the interval-on-timer IOT1 times out, at which time the 115 VAC power is withdrawn from the relay windings 332, allowing relay contacts 334 to open, and removing power from the remaining circuit elements. Latch time is represented in FIG. 9 by the CYCLE DURATION waveform.

Closure of relay contacts 334 communicates the 115 VAC line to the input terminals 1 of each of the interval-on-timers IOT2-IOT5; 115 VAC power is also applied to the relay windings 336 of motor relay R4, closing relay contacts 338. Relay contacts 338 are connected in the motor circuit (not shown) of router motor 252 (FIG. 5B), and their closure initiates operation of the motor.

When the 115 VAC power is applied to the interval-on-timers IOT2-IOT5 and their corresponding on-delay-timers ODT1-ODT4 the 115 VAC power is also applied across the solenoid windings SW-1, SW-2 and SW-3 for the time periods illustrated by the waveforms VSW-1, VSW-2 and VSW-3, respectively, in FIG. 9. Thereby, solenoids S1-S3 are activated which, in turn, actuate control valve 320, 322 and 324 (FIG. 7), effecting controlled operation of the pneumatic cylinders 218, 230, 254, and 262, of the face plate router mechanism 56. The ultimate result is that the router head 260 traverses that path represented in FIG. 10 from the home (H) position through the positions S and RS, around the path represented by the arrows a, b, c and d, returning to the home (H) position when the routing has been completed.

In summary, there has been disclosed a door preparation machine that, through automatic operation, significantly reduces the time required to prepare a door for hanging and, at the same time, offers features that act to protect the machine's operator. In addition, a number of the power elements used to drive various drills, and the like, are designed to operate on fluid power developed by an electric motor (i.e., the cutter head motor 24-FIG. 1) to realize relatively significant savings in power consumption and wear and tear normally encountered by electrical apparatus.

We claim:

1. Apparatus for preparing a door, comprising:
   support means for receiving and holding the door during preparation, the support means defining an infeed station, for receiving the door, and a drill station;
   drill means mounted to the support means and proximate the drill station for drilling a lock bore and a latch hole in the door;
   router means mounted to the support means for forming a face plate mortise in the longitudinal edge of the door and about the latch hole;
   control means coupled to the drill means and the router means for automatic operation thereof; and
   clamp means to clamp the door in the drill station when said door is positioned thereat, said clamp means being operably coupled to the control means to enable operation of the drill means and the router means.

2. The apparatus of claim 1, including shiftable carriage means mounted to said support means and having said router and latch drill means coupled thereto, said carriage means being operably controlled by said control means to alternately position said latch drill means and said router means relative to said door for forming said latch hole and said face plate mortise.

3. The apparatus of claim 1, including drive means mounted to the support means and intermediate said infeed station and said drill station for moving the door from the infeed station to the drill station.

4. The apparatus of claim 3, including cutter means mounted to the support means and intermediate the infeed and drill stations, the cutter means being relatively located to plane a longitudinal edge of the door as the door is moved from the infeed station to the drill station.

5. The apparatus of claim 3, including sanding means mounted to said support means and located intermediate said infeed station and said drill station for sanding said planed edge of said door as said door is moved from said infeed station to said work station by said drive means.

6. The apparatus of claim 5, wherein said sander means, said latch hole drill means, and said lock hole drill means each include fluid-operated drive elements for performing said drilling and routing operations.

7. The apparatus of claim 6, wherein said cutter means includes electrically operated motor means for performing said cutting operation; and including fluid pump means coupled to said electric motor, said fluid pump means being in fluid communication with each of said fluid drive means of said sander means, said lock drill means, and said latch drill means for providing fluid power to operate said fluid-operated drive elements.

8. The apparatus of claim 7, including control valve means interposed in said fluid communicating path between said fluid pump and said fluid-operated drive elements to selectively open and close said fluid communicating path in response to a signal from said control means.

9. Apparatus for automatically drilling a lock bore, and a latch hole, and for forming a mortise, in a door, comprising:
   support means;

clamp means mounted to the support means for clamping and holding the door;

first and second drill means mounted on and disposed in predetermined relation to the support means for respectively drilling the lock bore and the latch hole;

router means mounted to the support means for forming the face plate mortise in the door;

drive means coupled to the first and second drill means and to the router means for reciprocally moving the first and second drills into and out of drilling engagement with the door and for moving the router means into cutting engagement with the door; and control means coupled to the drive means for initiating and controlling sequential operation of the drive means to move the first drill means, the second drill means, and the router means in a predetermined sequence to form the lock bore, the latch hole, and the face plate mortise.

10. The apparatus of claim 9, the clamp means including means for positioning the door relative to the second drill means.

11. The apparatus of claim 10, the clamp means including first and second clamp elements adapted to be relatively positioned in spaced-apart relation with the door therebetween, and means for moving the first and second clamp elements toward one another and into clamping relation with the door.

12. The apparatus of claim 11, the clamp means including a pinion gear rotatably mounted thereto, a pair of rack gear elements mounted to the clamp means in operable engagement with the pinion gear, each of the rack gear elements being coupled to a corresponding one of the first and second clamp elements, and means for rotating the pinion gear to effect movement of the first and second clamp elements toward one another.

13. The apparatus of claim 9, including first and second hydraulic motors respectively coupled to the first and second drill means for driving said drill means to perform said drilling operations.

14. The apparatus of claim 9, wherein said support means defines an infeed station for receiving the door, a drill station, and a path of travel for the door between the infeed station and the drill station, and including sanding means for sanding a longitudinal edge of the door as the door is moved from the infeed station to the drill station, the sanding means including a third hydraulic motor for driving said sanding means.

15. The apparatus of claim 13, including means coupled to said first and second hydraulic motors and operable by said clamp means to enable said first and second motors when the door is clamped.

16. A door preparation machine for drilling a lock bore, a latch hole and for forming a face plate mortise in a door, comprising:

a support frame for supporting the door during preparation;

a lock drill and a latch drill mounted to the support frame, the lock and latch drills each including a hydraulic motor for operating the said lock drill and said latch drill;

electrically operated router means mounted to the support frame;

pump means coupled to the hydraulic motors of the lock and latch for providing fluid pressure to operate said hydraulic motors; and control means operably coupled to the lock drill, the latch drill, and the router means, for moving the lock drill, the latch drill, and the router in a predetermined sequence into and out of engagement with said door for drilling said lock bore and said latch hole and for forming the face plate mortise therein.

17. The door preparation machine of claim 16, including clamp means mounted to the frame support for clamping and holding the door during the drilling of the lock bore and the latch hole and the formation of the face plate router, the clamp assembly including means for positioning the door relative to the latch drill and router means.

18. The door preparation machine of claim 17, including valve means intercoupling the pump means and the hydraulic motors, the valve means being operably coupled to the clamp means to enable operation of the hydraulic motors when the door is clamped by the clamp means and to disable the hydraulic motors when the door is not clamped by the clamp means.

19. The door preparation machine of claim 16, including sander means for sanding a free edge of the door, the sander means including a hydraulic motor coupled to the pump means for operation thereof; and means interposed in the coupling between the hydraulic motors of the sander means, the lock drill, and the latch drill, the interposing means being operable in a first mode to enable the hydraulic motor of the sander means and disable the hydraulic motors of the lock and latch drills and a second mode to disable the hydraulic motor of the sander means and enable the hydraulic motors of the lock and latch drills.

20. The door preparation machine of claim 16, wherein the control means includes pneumatic actuated means for moving the lock drill, the latch drill and router means into and out of engagement with the door.

* * * * *